W. G. PAGETT.
Subsoil-Plow.
No. 7,732. Patented Oct. 22, 1850.
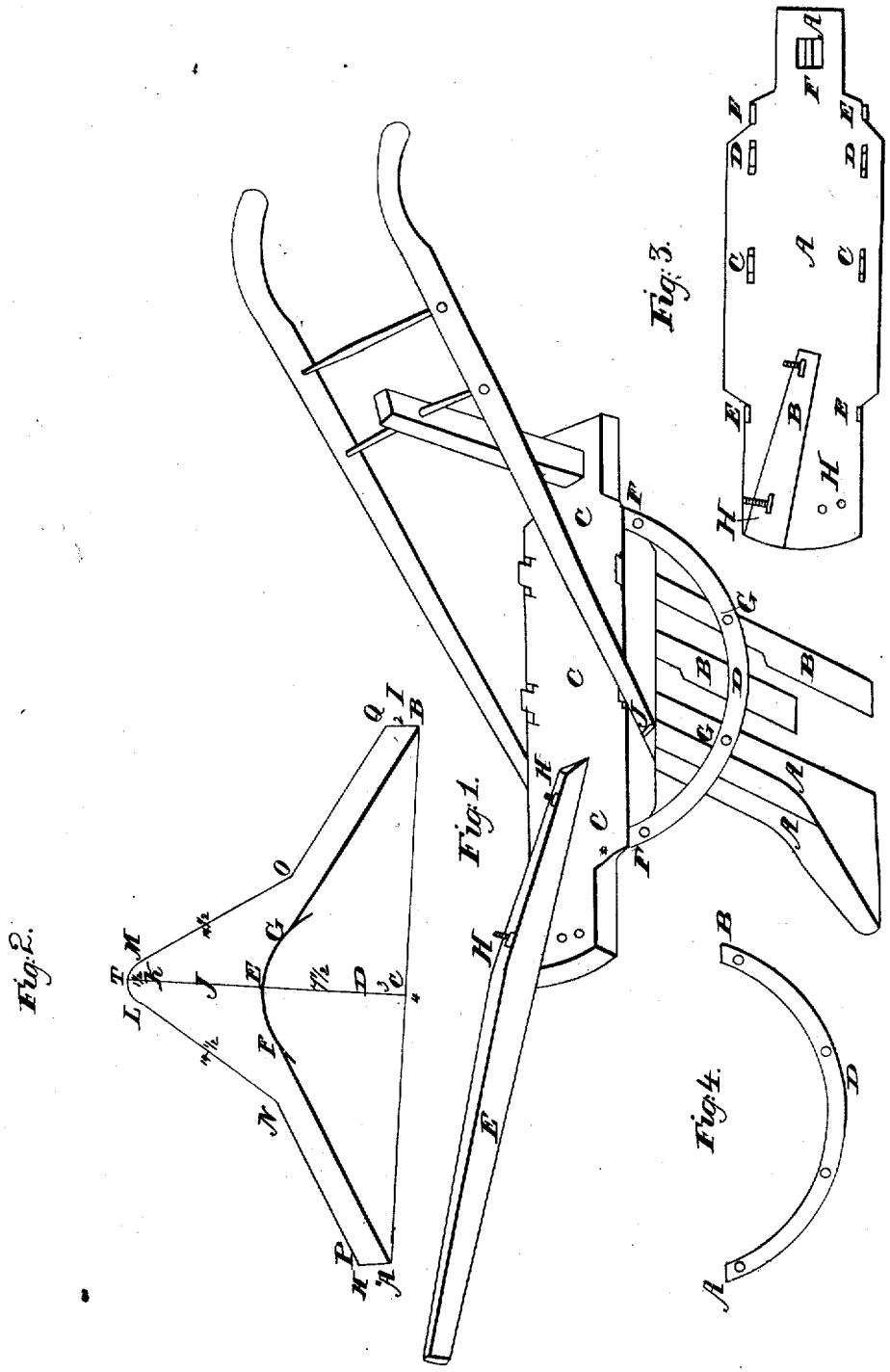

UNITED STATES PATENT OFFICE.

WM. C. PAGETT, OF GREENE COUNTY, OHIO.

IMPROVEMENT IN SUBSOIL-PLOWS.

Specification forming part of Letters Patent No. 7,732, dated October 22, 1850.

*To all whom it may concern:*

Be it known that I, WILLIAM C. PAGETT, of the county of Greene, in the State of Ohio, have invented a new and useful Improvement on the Subsoil-Plow.

The principle and construction of this subsoil-plow are such that an ordinary span of horses is capable of performing the same operation that requires from two to three yoke of cattle to perform with the subsoil-plow now in use, for as soon as the gouge or scoop enters the earth every inch relieves itself by an upward cut, passing the dirt back between the shanks, while at the same time the cutters in the rear widen and square the sides of the furrow, effecting the whole operation with the least possible pressure or friction, and at the same time rendering the dirt loose and friable; and I do hereby declare that the following is a full, clear, and exact description of the construction and operation of the same, reference being had to the annexed drawings, making part of this specification, in which—

Figure 1 is a perspective view. Fig. 2 represents the drafts and proportions of the gouge or scoop and the manner of "laying off" and constructing the same; Fig. 3, the slab or stock in which the gouge or scoop and cutters are fastened.

In Fig. 1, A A is the gouge or scoop; B B, the cutters that follow the scoop and widen and square the furrows; C C, the slab or stock; D D, semicircular bars, (one of which is entirely hid from view in the drawings,) attached to the edges of the slab or stock by means of strong bolts at F F, which brace and support the gouge A A and the two cutters B B. The shanks of the gouge and cutters are fastened to this semicircular bar with screw-bolts, as seen at G G. E E is the beam, fastened to the slab or stock with screw-bolts at H H.

The gouge or scoop is constructed in the following manner: Draw the line A B, Fig. 2, forty-one inches in length. At C in the middle of this line A B erect a perpendicular, C T, twenty and one-half inches. On the line C T, toward T, measure off three inches to D. At D, with a radius, D E, of seven and one-half inches, describe the arc F E G, cutting the line C T at E. From A draw a line till it touches the arc described with the radius D E at F.

In like manner draw the line B G. From A, at a right angle with A F, draw the line A H two inches in length. In the same manner draw the line B I two inches in length. From H and I draw lines parallel with A F and B G, meeting each other at J in the line C T. Then from T measure one and one-half inch toward C to K, and at K as a center with the radius K T one and one-half inch, describe the arc L T M, and from the point T, with a radius of fourteen and one half inches, describe arcs cutting the lines H J and I J at N and O. From N draw N L, touching the arc L T M, described with the radius K T at L, and in the same manner draw the line O M. Finally, draw A P and B Q at right angles with the line A B, and then will the figure A P N L T M O Q B G E F A fully describe the shape and size of the scoop before it is bent concave. The scoop is thus brought to the right form by bending the figure N L T M O G E F N concave round a cylinder of six inches diameter until the points N and O approximate within ten inches of each other. The shanks A N and B O being kept perfectly straight, the ends A and B, which are the upper ends of the shanks when the gouge or scoop is made ready to adjust to the stock or slab, will consequently be the same distance (ten inches) apart. The scoop or gouge, when thus constructed, is ten inches from E to the point T, seventeen and one-half inches from N to O, and the shanks P N and O Q are each thirteen and one-half inches in length.

Fig. 3 represents the slab through which the top ends of the shanks of the gouge or scoop and cutters pass, and to which the beam and handle are attached, the slab A A measuring in length forty-one inches, greatest width thirteen inches, and its width where the semicircular bars E E connect ten inches; the width between the mortises C C and D D the same— ten inches; from the fore end of the slab back to the shoulders at E E, ten inches; from the shoulders E E to the centers of the mortises C C, eleven inches; from the center of the mortises at C C to the center of the mortises at D D, nine inches, the mortise at F being three by one and one-half inches and two and one-half inches distance from the lateral end of the slab, the bolt at G, which fastens the end of the beam to the slab being thirteen inches from the fore end of the slab. H H are two pairs of holes in the end of the slab, eleven inches from the bolt at G, by which the beam is so adjusted by passing a bolt down through the beam into any one of the holes as to accommodate the subsoil-plow to either a right or left hand plow.

Fig. 4 represents the semicircular braces which are made of bar-iron three-eighths by one and one-fourth inches. They are bent to a radius of fourteen inches, being twenty-six inches from A to B and nine inches from D to C.

The handles are fastened to the slab by means of a cross spoke, which passes through an upright timber tenoned into the mortise in the slab, Fig. 3, F, and having their lower ends fastened to the edges of the slab with common staples I I, Fig. 1, in a manner similar to the handles of a common shovel-plow, and which needs no particular description.

What I claim as my invention, and desire to secure by Letters Patent, is—

The scoop-instrument A A, with the combination of the cutters in the rear, as a subsoil-plow.

WM. C. PAGETT.

Witnesses:
  J. A. SEXTON,
  N. B. STIPP.